United States Patent Office 3,260,726
Patented July 12, 1966

3,260,726
2-(HETEROCYCLIC)-ISOTHIOUREA
Klaus Sasse, Engelbert Kühle, and Ludwig Eue, Cologne-Stammheim, Germany, assignors to Farbenfabriken Bayer Aktiengesellschaft, Leverkusen, Germany, a German corporation
No Drawing. Filed Aug. 1, 1963, Ser. No. 299,174
Claims priority, application Germany, Sept. 5, 1962, F 37,752
5 Claims. (Cl. 260—306.6)

The present invention is concerned with hitherto unknown isothiourea derivatives, which have herbicidal properties, and with a process for their production.

It is an object of the present invention to make available new isothiourea derivatives. A further object consists in the enrichment of the herbicidal active materials with further herbicidal active materials, some of which also have selective properties. Finally, an object of the invention is to be seen in the indication of a process for the production of these new isothioureas. Further objects can be seen from the following description and the examples.

It has been found that isothioura derivatives of the general formula

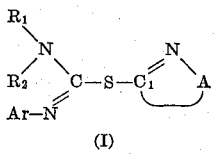

(I)

in which
$R_1$ and $R_2$ individually stand for optionally substituted alkyl radicals,
$R_1$ and $R_2$, together with the N-atom, stand for an optionally substituted heterocyclic radical,
Ar stands for optionally substituted aryl radical, and
A, together with the

group, stands for a possibly substituted heterocyclic radical having 1–3 rings which is, excepting the α-position to $C_1$, substituted by the radical:

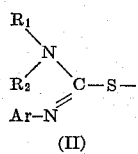

(II)

show strong herbicidal properties.

Furthermore, it has been found that isothiourea derivatives of the Formula I are obtained when arylimino-carbonic acid amide halides of the formula:

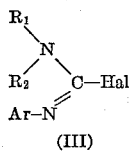

(III)

in which $R_1$, $R_2$ and Ar have the same meaning as given above and Hal stands for halogen, are reacted with cyclic thioamides of the formula:

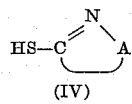

(IV)

in which A, together with the

group, has the same meaning as given above, possibly in the presence of an acid-binding agent and possibly in the simultaneous presence of a solvent.

The cyclic thioamides are given in the Formula IV in the enthiol form. The enthiol form is in equilibrium with the thiono form corresponding to the following formula:

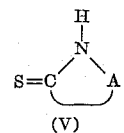

(V)

The arylimino-carbonic acid amide halides are clearly characterised by the Formula III. In this formula, $R_1$ and $R_2$ preferably stand for alkyl with 1–5 carbon atoms, possibly substituted by halogen and/or alkoxy with 1–4 carbon atoms. $R_1$ and $R_2$, together with the nitrogen atom, preferably stand for heterocyclic radicals which have 5–6 ring members and are possibly substituted by halogen and/or alkoxy with 1–4 carbon atoms. Ar preferably stands for the phenyl or naphthyl radical. These radicals may be substituted by alkyl radicals with 1–4 carbon atoms, halogen and/or alkoxy with 1–4 carbon atoms.

As examples of arylimino-carbonic acid amide halides, there may be mentioned:

Phenylimino-carbonic acid dimethylamide chloride,
Phenylimino-carbonic acid diethylamide bromide,
Phenylimino-carbonic acid-bis-(2-methoxy-ethyl)-amide chloride,
Chlorophenylimino-carbonic acid dimethylamide chloride,
Dichlorophenylimino-carbonic acid dimethyl-amide chloride,
Phenylimino-carbonic acid morpholide bromide,
Phenylimino-carbonic acid piperide chloride, as well as chlorophenylimino-carbonic acid pyrrolidine chloride,
4-methyl-phenylimino-carbonic acid dimethylamide chloride, and
4-methoxy-phenylimino-carbonic acid dimethyl-amide chloride.

The cyclic thioamides used for the process according to the invention are clearly characterized by the above Formula IV. Therein, A, together with the

group, preferably stands for a heterocyclic radical with 1–3 rings, whereby all rings or only one or two rings may be of heterocyclic nature. The remaining rings can be of aromatic or cycloaliphatic nature. The individual ring systems preferably have 5–6 ring members. These heterocyclic radicals can be substituted by radicals of the Formula II, haloalkyl with 1–2 carbon atoms, nitro, aryl, such as phenyl, alkyl with 1–4 carbon atoms, alkoxy or alkylmercapto with 1–4 carbon atoms, the amino group, alkylamine and dialkylamino with 1–4 carbon atoms, carboxylic acid ester, carboxylic acid amide groups and/or halogen.

As heterocyclic thioamides which, according to the invention, are able to yield S-heterocyclically substituted isothioureas with the arylimino-carbonic acid amide halides, in detail, the following groups of compounds may be mentioned: 2-mercapto-pyridines, 2-mercapto-quinolines, mercapto-imidazoles and -imidazolines, mercapto-pyrimidines, e.g. thiouracils and thiobarbituric acids, mercapto-pyrazines, thiohydantoins, rhodanines, mercapto-1,2,4-triazoles, mercapto-thiazoles and -oxazoles, mercapto-thiazolines and -oxazolines, mercapto-1,3,4-thiadiazoles and -oxadiazoles, mercapto-1,2,4- and -1,3,5-triazines, e.g. 2-mercapto-4,6-diamino-triazine-(1,3,5), 2 - mercapto-4-ethylamino-6-chloro-triazine - (1,3,5), mercapto-quinazolines, monomercapto-quinoxalines, mercapto-phthalazines, mercapto-benzimidazoles, mercapto-benzoxazoles, mercapto-benzthiazoles, mercapto-indazoles, thiouric acids and other mercapto purines.

The reaction according to the invention can be carried out in the presence of solvents. For this purpose, there are suitable: inert organic solvents, such as hydrocarbons, for example benzene; chlorinated hydrocarbons, for example chlorobenzene; ethers, for example dioxan; ketones, for example acetone, and also esters. It is moreover, also possible to work in the presence of water.

For the neutralisation of the hydrogen halide formed in the reaction according to the invention, there are used the usual acid-binding agents, such as tertiary bases, for example pyridine, N,N-dimethyl-aniline, alkali metal carbonates, such as sodium carbonate and potassium carbonate; alkali metal hydroxides, such as sodium and potassium hydroxide. However, the alkali metal salts of the mercapto compounds can also be used instead of the free mercapto compounds.

The reaction according to the invention can be carried out in a wide temperature range. It is expedient to work between −10 and +100° C., preferably in the range of 0° to 50° C.

The reaction of the arylimino-carbonic acid amide halides with the cyclic thioamides preferably takes place in solution or suspension with the addition of acid-binding agents. This reaction may be carried out, for example, in such a manner that the reaction components are allowed to act upon one another in an organic diluent in the presence of a tertiary amine. According to another method of procedure, the metal salts of the thioamides are reacted in solution or suspension with the aryl-imino-carbonic acid amide halides. According to the simplest and, in most casts, satisfactorily proceeding process, solutions of the cyclic thioamides are mixed, in the presence of at least molecular amounts of a strong inorganic base, possibly after dilution with a water-miscible solvent, with molecular amounts of the arylimino-carbonic acid amide halide. In the presence of water, the reactions must be carried out with careful cooling in order to avoid saponification of the arylimino-carbonic acid amide halides.

Working up of the reaction mixtures obtainable according to the invention takes place according to known methods. It is, for example, possible to proceed in such a manner that the reaction mixture is poured into water, the separated product taken up in an organic solvent and the solvent subsequently distilled off.

The compounds according to the invention influence the growth of plants and can, therefore, be used as weed destroying agents. By weeds there is to be understood, in the widest sense, all plants which grow in places where they are not desired. Whether the compounds according to the invention act as total or selective herbicides depends, in the main, upon the amount used.

The compounds according to the invention can be used in the case of the following plants for example: dicotyledons, such as mustard (Sinapis), cress (Lepidium), milkweed (Galium), chickweed (Stellaria), camomile (Matricaria), French weed (Galinsoga), goose foot (Chenopodium), stinging nettle (Urtica), old-man's-beard (Senecio), cotton (Gossypium), beet (Beta), carrots (Daucus), beans (Phaseolus), potatoes (Solanum), coffee (Coffea); monocotyledons, such as timothy grass (Phleum), panicle grass (Poa), fescue grass (Festuca), eleusine (Eleusine), bristle grass (Setaria), ryegrass (Lolium), bromegrass (Bromus), hen millet (Echinochloa), maize (Zea), rice (Oryza), oats (Avena), barley (Hordeum), wheat (Triticum), millet (Panicum) and sugarcane (Saccharum).

In this list, the given types of plants are to be understood as representative examples for the species indicated in Latin. The use of the compounds according to the invention is, nevertheless, in no way limited to these species but extends, in the same manner, also to other plants.

The compounds according to the invention can be used as such or in the form of the usual formulations, such as emulsifiable concentrates, spray powders, pastes, soluble powders, dusting agents and granulates. These are produced in known manner (cf. Agricultural Chemicals, March 1960, pages 35–38). As auxiliaries the following are mainly to be used: solvents, such as aromatics (e.g. xylene, benzene), chlorinated aromatics (e.g. chlorobenzenes), paraffins (e.g. mineral oil fractions), alcohols (e.g. methanol, butanol), amines (e.g. ethanolamine, dimethyl formamide), and water; carrier materials, such as natural rock powders (e.g. kaolin, clay, talc, chalk) and synthetic rock powders (e.g. highly dispersed silicic acid, silicates); emulsifying agents, such as non-ionic and anionic emulsifiers (e.g. polyoxyethylene-fatty acid esters, polyoxyethylene-fatty alcohol ethers, alkyl sulphates and aryl sulphonate); and dispersing agents, such as lignin, sulphite waste liquors and methyl cellulose.

The active materials according to the invention can be present in the formulations in admixture with other known active materials.

The formulations contain, in general, between 0.1 and 95 percent by weight of active material, preferably between 0.5 and 90.

The compounds obtainable according to the invention or their preparations are used in customary manner, for example, by pouring, spraying, scattering or dusting.

EXAMPLE A

*Post-emergence test*

Solvent: 10 parts by weight of acetone,
Emulsifier: 5 parts by weight of benzyl diphenylhydroxy-polyoxyethylene ether.

For the production of a suitable active material preparation, 1 part by weight of active material is mixed with the stated amount of solvent, the stated amount of emulsifier added thereto, and the concentrate subsequently diluted with water to the desired concentration.

Test plants which have a height of about 5–15 cm. are sprayed with the active material preparation until just dew wet. After three weeks, the degree of damage of the plants is determined and assessed with the characterising numbers 0–5 which have the following meaning:

0 no effect,
1 single light burnt spots,
2 clear leaf damage,
3 single leaves and stem parts partially destroyed, 4 plants partially destroyed,
5 plants completely destroyed.

Active materials, active material concentrations and results can be seen from the following table:

TABLE.—POST-EMERGENCE TEST

| No. | Active material | Active material concentration in percent | Mustard | Oats | Beet | Cotton | Wheat | Millet | Tomatoes | Beans |
|---|---|---|---|---|---|---|---|---|---|---|
| (1) | Compound according to Example 1 | 0.4 | 5 | 3 | 4 | 1 | 1 | 5 | 2 | 3 |
| (2) | Compound according to Example 2 | 0.4 | 5 | 5 | 5 | 2 | 4 | 5 | 5 | 5 |
| (3) | Compound according to Example 5, first formula. | 0.4 | 5 | 5 | 5 | 2 | 3 | 5 | 3 | 3 |
| (4) | Compound according to Example 5, second formula. | 0.4 | 4–5 | 4–5 | 5 | 4 | 3 | 5 | 5 | 5 |
| (5) | Compound according to Example 6 | 0.4 | 0 | 0 | 5 | 0 | 1 | 5 | 1 | 2 |
| (6) | Compound according to Example 12a | 0.4 | 5 | 4 | 5 | 2 | 2 | 5 | 2 | 4–5 |
| (7) | Compound according to Example 12b | 0.4 | 5 | 4 | 5 | 3 | 2 | 5 | 4 | 5 |
| (8) | Compound according to Example 12c | 0.4 | 5 | 4 | 5 | 2–3 | 3 | 5 | 2 | 5 |
| (9) | Compound according to Example 12d | 0.4 | 5 | 3 | 5 | 3 | 1 | 5 | 2 | 4–5 |
| (10) | Compound according to Example 12e | 0.4 | 5 | 3 | 1 | 1 | 1 | 4 | 1 | 1 |
| (11) | Compound according to Example 12f | 0.4 | 5 | 2 | 1 | 1 | 1 | 4 | 0 | 0 |
| (12) | Compound according to Example 12g | 0.4 | 5 | 4 | 3 | 3 | 2 | 4 | 2 | 2 |
| (13) | Compound according to Example 12h | 0.4 | 5 | 4 | 4 | 3 | 1 | 4–5 | 3 | 4 |

EXAMPLE B

*Pre-emergence test*

Solvent: 10 parts by weight of acetone
Emulsifier: 5 parts by weight of benzyl diphenylhydroxypolyoxyethylene ether For the production of a suitable active material preparation, 1 part by weight of active material is mixed with the stated amount of solvent, the stated amount of emulsifier added thereto and the concentrate diluted with water to the desired concentration.

Seeds of the test plants are sown in normal soil and, after 24 hours, the active material preparation is poured thereon. The amount of water per unit surface area is thereby expediently kept constant. The active material concentration in the preparation is of no importance; only the amount of active material applied per unit surface area is decisive. After three weeks, the degree of damage to the test plants is determined and assessed with the characterising numbers 0–5 which have the following meaning:

0 no effect,
1 slight damage or delay of growth,
2 distinct damage or growth inhibition,
3 considerable damage and only deficient development, or only 50% germination,
4 plants partially destroyed after germination, or only 25% germination,
5 plants completely destroyed or no germination.

Active materials, active material concentrations and results can be seen from the following table:

and, after dilution with 150 ml. of acetone, mixed dropwise, while cooling to 0 to 5° C., with 18.2 g. of phenylimino-carbonic acid dimethylamide chloride. The mixture is stirred for a further ½ hour with cooling, 1 hour at room temperature and 1 hour at 35–40° C. and, after cooling, mixed with water. The separated product is taken up in benzene, the benzene solution dried and evaporated in a vacuum. The residue yields, after recrystallisation from alcohol, 15 g. of a compound of the formula

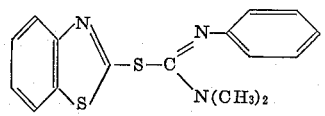

(M.P. 158–160° C.).

EXAMPLE 2

15 g. of 2-mercapto-benzimidazole are dissolved in a solution of 4 g. of sodium hydroxide in 40 ml. of water and reacted, as in Example 1, with 18.2 g. of phenyliminocarbonic acid dimethylamide chloride. The product precipitated with water at the end of the reaction is pressed out on clay and recrystallised from alcohol. Yield 16 g. of a compound of the formula

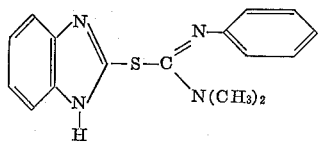

(M.P. 160–161° C.).

TABLE.—PRE-EMERGENCE TEST

| No. | Active material | Active material employed in kg./ha. | Mustard | Oats | Beet | Cotton | Wheat | Millet | Tomatoes | Beans |
|---|---|---|---|---|---|---|---|---|---|---|
| (1) | Compound according to Example 1 | 40 | 5 | 3–4 | 5 | 0 | 3 | 4 | | |
| (2) | Compound according to Example 2 | 40 | 5 | 5 | 5 | 4–5 | 4 | 5 | | |
| (3) | Compound according to Example 5 first formula. | 40 | 5 | 4 | 3 | 0 | 4 | 3 | | |
| (4) | Compound according to Example 5 second formula. | 40 | 5 | 4–5 | 5 | 1 | 1 | 4–5 | | |
| (5) | Compound according to Example 6 | 40 | 5 | 1 | 1 | 0 | 3 | 0 | | |

The following examples are given for the purpose of illustrating the present invention:

EXAMPLE 1

16.7 g. of 2-mercapto-benzothiazole are dissolved in a solution of 4 g. of sodium hydroxide in 40 ml. of water

EXAMPLE 3

15.1 g. of 2-mercapto-benzoxazole are dissolved in a solution of 4 g. of sodium hydroxide in 40 ml. of water and, after dilution with 150 ml. of acetone reacted as in Example 1 with 18.2 g. of phenylimino-carbonic acid dimethyl-amide chloride. The product precipitated with water at the end of the reaction is filtered off with suction and recrystallised from ethyl acetate. Yield 19 g. of a compound of the formula

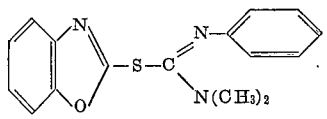

(M.P. 185–188° C.).

EXAMPLE 4

16.2 g. of 2-mercapto-quinoxaline are dissolved in an aqueous acetonic sodium hydroxide solution as in Example 1 and reacted with 18.2 g. of phenylimino-carbonic acid dimethyl-amide chloride. The reaction product precipitated with water is taken up in benzene, the benzene solution dried over sodium sulphate and evaporated in a vacuum. As residue there remain 18 g. of the compound:

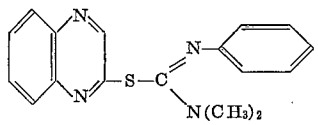

in the form of a viscous, dark brown oil.

Calc.: N, 18.17%; S, 10.40%. Found: N, 17.85%; S, 10.8%.

In a corresponding manner, the reaction between 3-methyl-2-mercapto-quinoxaline and phenylimino-carbonic acid dimethylamide chloride also provides an oily reaction product which, for purification, is dissolved in carbon tetrachloride and treated with active charcoal.

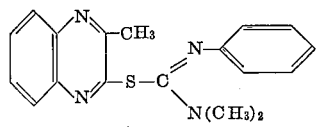

Calc.: N, 17.38%; S, 9.95%. Found: N, 16.80%; S, 9.60%.

EXAMPLE 5

21.4 g. of the sodium salt of 2-methoxy-3-mercapto-quinoxaline are suspended in 150 ml. of acetone. 18.2 g. of phenylimino-carbonic acid dimethylamide chloride are added dropwise at room temperature. The mixture is then stirred for a further hour at room temperature, the solution of 2 g. of sodium hydroxide in 50 ml. of water added thereto and further stirred for one hour at room temperature. Upon the addition of water, crystals separate out, which are filtered off with suction, dried and recrystallised from benzene. Yield 15 g. of a compound of the formula

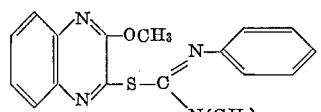

(M.P. 130–132° C.).

EXAMPLE 6

20.5 g. of 2-ethylamino-3-mercapto-quinoxaline are reacted, as in Example 1, with 18.2 g. of phenylimino-carbonic acid dimethylamide chloride in the presence of aqueous sodium hydroxide solution. The working up yields 20 g. of a non-crystallising, viscous, yellow oil with the constitution:

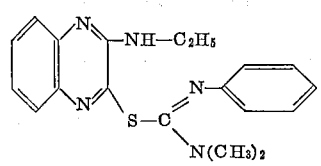

Calc.: N, 19.92%; S, 9.12%. Found: N, 19.37%; S, 8.80%.

EXAMPLE 7

17.5 g. of 2-mercapto-4-methylquinoline are dissolved in a solution of 4 g. of sodium hydroxide in 40 ml. of water and, after the addition of 150 ml. of acetone, as in Example 1, reacted with 18.2 g. of phenylimino-carbonic acid dimethylamide chloride. The initially oily product precipitated with water crystallises upon trituration with a little ligroin. For purification, it is dissolved in hot methanol and, with good cooling, again precipitated by the dropwise addition of water. Yield 23 g.

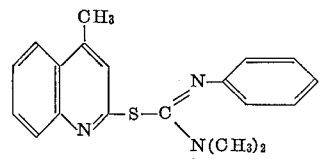

(M.P. 85–87° C.).

EXAMPLE 8

16.2 g. of 4-mercapto-quinazoline are reacted, as in Example 1, with 18.2 g. of phenylimino-carbonic acid dimethylamide chloride with the addition of the calculated amount of aqueous sodium hydroxide solution. The reaction product is recrystallised from alcohol. Yield: 18 g.

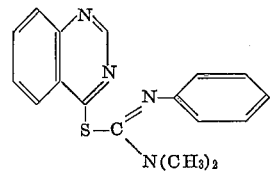

(M.P. 162–164° C.).

EXAMPLE 9

10.1 g. of 3-mercapto-1,2,4-triazole are reacted, as in Example 1, with 21.8 g. of (p-chlorophenylimino)-carbonic acid dimethylamide chloride in the presence of the calculated amount of aqueous sodium hydroxide solution. The oily product precipitated with water at the end of the reaction is taken up in benzene, the benzene solution dried over sodium sulphate and evaporated in a vacuum. Yield: 17 g. of a viscous oil with the constitution:

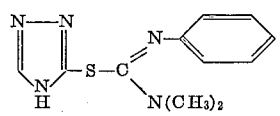

Calc.: 11.38% S; 24.84% N. Found: 10.77% S; 26.4% N.

EXAMPLE 10

7.2 g. of 3,6-dimercapto-pyridazine are dissolved in a solution of 4 g. of sodium hydroxide in 40 ml. of water and, after dilution with 150 ml. of acetone as in Example 1, reacted with 18.2 g. of phenylimino-carbonic acid dimethylamide chloride. Working up is carried out as in Example 9. There are obtained 13 g. of a viscous oil with the constitution:

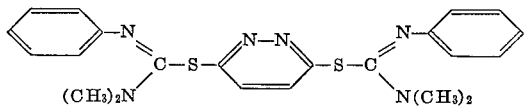

Calc.: N, 19.27%; S, 14.68%. Found: N, 19.95%; S, 14.30%.

EXAMPLE 11

17.7 g. of trithiocyanuric acid are dissolved in a solution of 12 g. of sodium hydroxide in 50 ml. of water. The solution is mixed with 200 ml. of acetone and then treated dropwise, with cooling at 0 to 5° C., with 54.6 g. of phenyl-iminocarbonic acid dimethylamide chloride. The mixture is further stirred for ½ hour with cooling, for 1 hour at room temperature and for 1 hour at 35–40° C. The somewhat greasy product precipitated by the addition of water after cooling, becomes crystalline upon stirring with alcohol. It is filtered off with suction and dried. The further purification is carried out in the following manner: The hot chloroform solution of the crude product is mixed with ligroin until the commencement of cloudiness and cooled to room temperature. The solution is decanted from the separated, greasy precipitate, mixed with further ligroin and cooled in ice. Yield: 30 g. of a compound of the formula

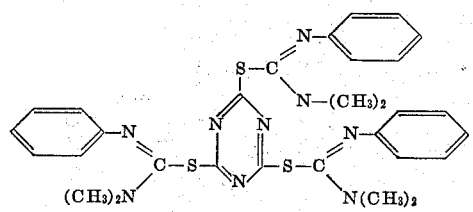

(M.P. 263–265° C.).

EXAMPLE 12

14.75 g. of 2-chloro-3-mercapto-quinoxaline are dissolved in a solution of 3 g. of sodium hydroxide in 50 ml. of water. After dilution with 100 ml. of acetone, 13.7 g. of phenylimino-carbonic acid dimethylamide chloride are added dropwise, with cooling, at a temperature between 5 and 10° C. The mixture is further stirred for a ½ hour with cooling and for 1 hour at room temperature, 250 ml. of water are added, and the separated product is filtered off with suction. It is washed with water and dried. Yield: 23 g. of a compound of the formula (12a)

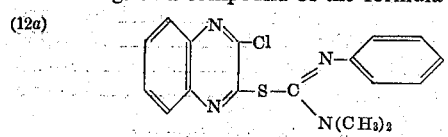

M.P. 230–232° C. (alcohol).

By an analogous working method, there is obtained from 2,5-dimercapto-1,3,4-thiadiazole a compound of the formula (12b)

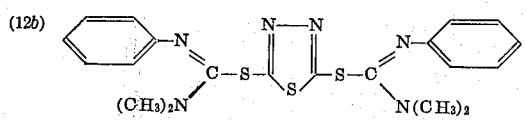

M.P. 54–56° C., from 2-mercapto-5-phenyl-1,3,4-oxadiazole a compound of the formula (12c)

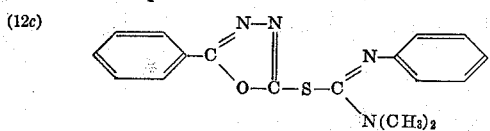

(yellow oil calc.: 17.27% N; 9.88% S; found: 17.53% N; 9.44% S); from 2-mercapto-4,6,6-trimethyl-dihydro-1,3-thiazine a compound of the formula (12d)

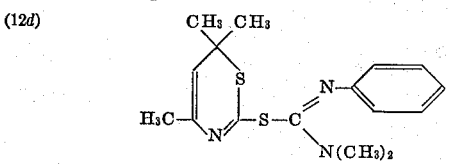

(yellow oil calc.: 13.15% N; 20.04% S; found: 13.04% N; 21.10% S); from rhodanine a compound of the formula (12e)

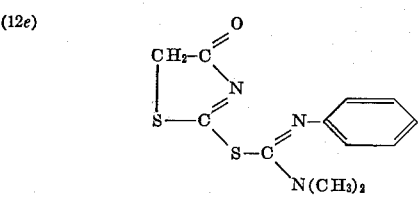

M.P. 171° C. (butanol/ligroin), from 2-mercapto-4,6-diamino-triazine a compound of the formula (12f)

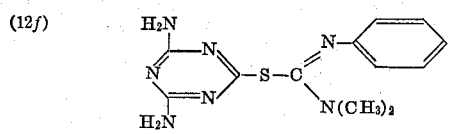

M.P. >270° C., from 2,6-dimercapto-4-methyl-pyrimidine a compound of the formula:

(12g)

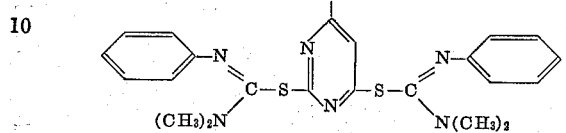

(yellow oil calc.: 19.5% N; 14.88% S; found: 18.18% N; 14.57% S); from ethylene thiourea a compound of the formula (12h)

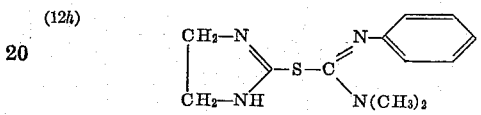

(yellow oil calc.: 22.55% N; 12.90% S; found: 22.87% N; 12.32% S.)

EXAMPLE 13

22.5 g. of 2-mercapto-benzimidazole are dissolved in a solution of 6 g. of sodium hydroxide in 60 ml. of water. After dilution with 200 ml. of acetone, 32.5 g. of p-chlorophenylimino-carbonic acid dimethylamide chloride are added dropwise with cooling at 0–5° C. The mixture is then further stirred for ½ hour with cooling, and for 1½ hours at room temperature. The mixture is mixed with 250 ml. of water and further stirred until the product which initially precipitates as an oil crystallises. It is filtered off with suction, dried and recrystallised from a little benzene. Yield: 35 g. of a compound of the formula

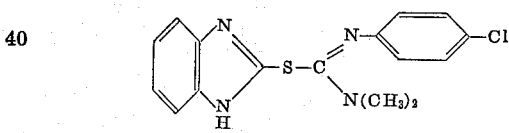

M.P. 86–88° C.

EXAMPLE 14

According to the working method described in Example 13, there is obtained from 2-mercapto-5-methyl-benzimidazole and phenylimino-carbonic acid dimethylamide chloride, a compound of the formula (14a)

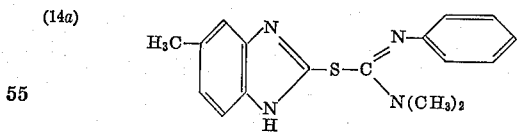

M.P. 183° C. (benzene-ligroin), and from other 2-mercapto-benzimidazoles substituted in the benzene nucleus also the following compounds:

(14b)

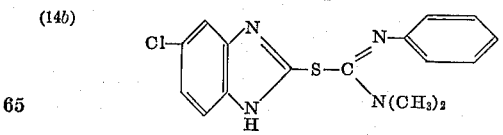

M.P. 120–122° C.

(14c)

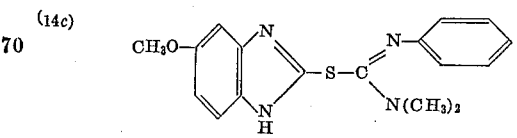

M.P. 94° C.

(14d) 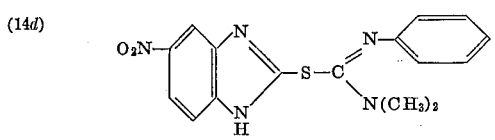

M.P. 92° C.

(14e) 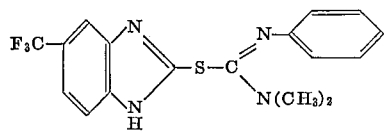

M.P. 188–190° C. (ether/ligroin)

We claim:
1. A compound of the formula

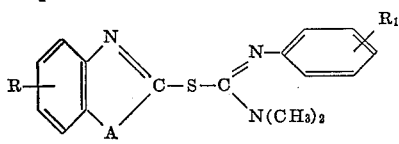

in which
R is a member selected from the group consisting of hydrogen, lower alkyl, chloro, methoxy, trifluoromethyl, and nitro;
$R_1$ is a member selected from the group consisting of hydrogen and chloro; and
A is a member selected from the group consisting of =NH, =S and =O.

2. A compound of the formula

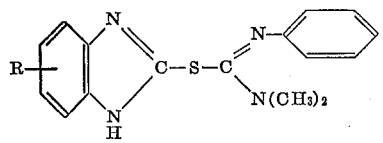

wherein R is a member selected from the group consisting of hydrogen, methyl, chloro, methoxy, trifluoromethyl and nitro.

3. A compound of the formula

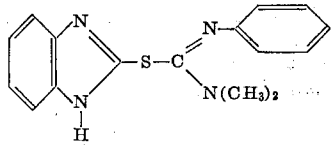

4. A compound of the formula

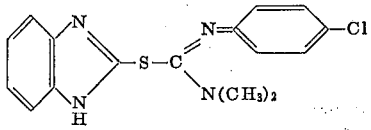

5. A compound of the formula

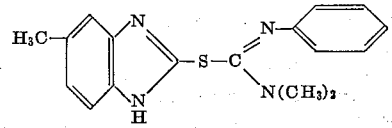

References Cited by the Examiner

UNITED STATES PATENTS

| | | | |
|---|---|---|---|
| 2,999,046 | 9/1961 | Rosen | 167—30 |
| 3,029,238 | 4/1962 | Sasse et al. | 260—250 |
| 3,040,046 | 6/1962 | Sasse et al. | 260—250 |
| 3,092,483 | 6/1963 | Perkow | 71—2.5 |
| 3,097,944 | 7/1963 | Riddell et al. | 71—2.5 |

HENRY R. JILES, *Acting Primary Examiner.*

NICHOLAS S. RIZZO, *Examiner.*